(12) United States Patent
Machewirth et al.

(10) Patent No.: US 9,411,109 B2
(45) Date of Patent: Aug. 9, 2016

(54) OPTICAL FIBER MOUNT

(71) Applicant: Nufern, East Granby, CT (US)

(72) Inventors: David Machewirth, Vernon, CT (US);
David Björk, East Granby, CT (US);
David Hosmer, West Springfield, MA (US); Joshua Galipeau, Montgomery, MA (US)

(73) Assignee: Nufern, East Granby, CT (US)

( * ) Notice: Subject to any disclaimer, the term of this patent is extended or adjusted under 35 U.S.C. 154(b) by 0 days.

(21) Appl. No.: 14/488,063

(22) Filed: Sep. 16, 2014

(65) Prior Publication Data

US 2015/0078721 A1   Mar. 19, 2015

Related U.S. Application Data

(60) Provisional application No. 61/878,527, filed on Sep. 16, 2013.

(51) Int. Cl.
*G02B 6/00* (2006.01)
*G02B 6/36* (2006.01)

(52) U.S. Cl.
CPC .................................. *G02B 6/3616* (2013.01)

(58) Field of Classification Search
None
See application file for complete search history.

(56) References Cited

U.S. PATENT DOCUMENTS

| | | | | |
|---|---|---|---|---|
| 4,276,113 A | * | 6/1981 | Carlsen | G02B 6/255 156/158 |
| 2005/0168804 A1 | * | 8/2005 | Dawson | H01S 3/06704 359/341.1 |
| 2007/0183733 A1 | * | 8/2007 | Zheng | G02B 6/3616 385/136 |

* cited by examiner

*Primary Examiner* — Tina Wong
*Assistant Examiner* — Chad Smith
(74) *Attorney, Agent, or Firm* — McDonnell Boehnen Hulbert & Berghoff LLP

(57) ABSTRACT

The present invention relates generally to a mount for securely holding an optical fiber in place, for example, on an optical bench or a translation stage. In one embodiment, the mount includes a lower block having a first portion, which has an upward-facing channel formed in the top surface thereof and extending from the front surface to the rear region. The channel forms a groove at its bottom. The mount further includes an upper block disposed over the first portion of the lower block. The upper block has a downward-facing ridge that includes one or more holding surfaces disposed adjacent the groove and extending along the downward-facing ridge. The upper block is held against the first portion of the lower block, such that the one or more holding surfaces are positioned to hold the optical fiber in the groove.

20 Claims, 7 Drawing Sheets

OPTICAL FIBER MOUNT

CROSS-REFERENCE TO RELATED APPLICATIONS

This application claims the benefit of priority of U.S. Provisional Patent Application Ser. No. 61/878,527, filed Sep. 16, 2013, which is hereby incorporated herein by reference in its entirety.

BACKGROUND OF THE INVENTION

1. Field of the Invention

The present invention relates generally to optical fiber technologies. The present invention relates more particularly to a mount for securely holding an optical fiber in place, for example, on an optical bench or a translation stage.

2. Technical Background

Optical systems that include optical fibers have the requirement that the fiber must be precisely aligned with respect to the other optical components in order to optimize the performance of the device. Moreover, once an optical fiber is in alignment, it needs to be held in place securely. While in the fabrication of fixed devices, it is common to glue, cement, fuse, or otherwise permanently fix the optical fiber in place, in a laboratory setting this is less desirable. But common laboratory optical fiber mounts often do not provide sufficient optical and mechanical protection for the optical fiber, especially when high powers are to be transmitted therethrough.

Accordingly, there remains a need for improved optical fiber mounts.

SUMMARY OF THE INVENTION

One aspect of the present invention is a mount for use with an optical fiber, the mount including
a lower block having a first portion, the first portion having a front surface, a rear region and a top surface, the top surface of the first portion having an upward-facing channel formed therein extending from the front surface to the rear region, the channel forming a groove at its bottom; and
an upper block disposed over the first portion of the lower block, the upper block having a downward-facing ridge that closely fits within the upward-facing channel formed in the top surface of the first portion of the lower block, the downward-facing ridge including one or more holding surfaces disposed adjacent the groove and extending along the downward-facing ridge,
the upper block being held against the first portion of the lower block, such that the one or more holding surfaces are configured to hold the optical fiber in the groove at the bottom of the channel of the first portion of the lower block.

Another aspect of the present invention is a method for mounting an optical fiber in a mount as described above. The method includes disposing the optical fiber in the groove of the lower block, then positioning the upper block against the lower block such that the one or more holding surfaces hold the optical fiber in the groove at the bottom of the channel of the first portion of the of the lower block. The method can also include, before disposing the optical fiber in the groove, moving the upper block away from the lower block.

In certain aspects, the present disclosure provides fast, convenient fiber output positioners useful for terminating optical fibers in optomechanical systems, such as on optical benches and translation stages. Various aspects of the present invention can result in a number of benefits, as will be evident to the person of ordinary skill in the art in view of the present disclosure.

DETAILED DESCRIPTION OF THE INVENTION

Figure 1:
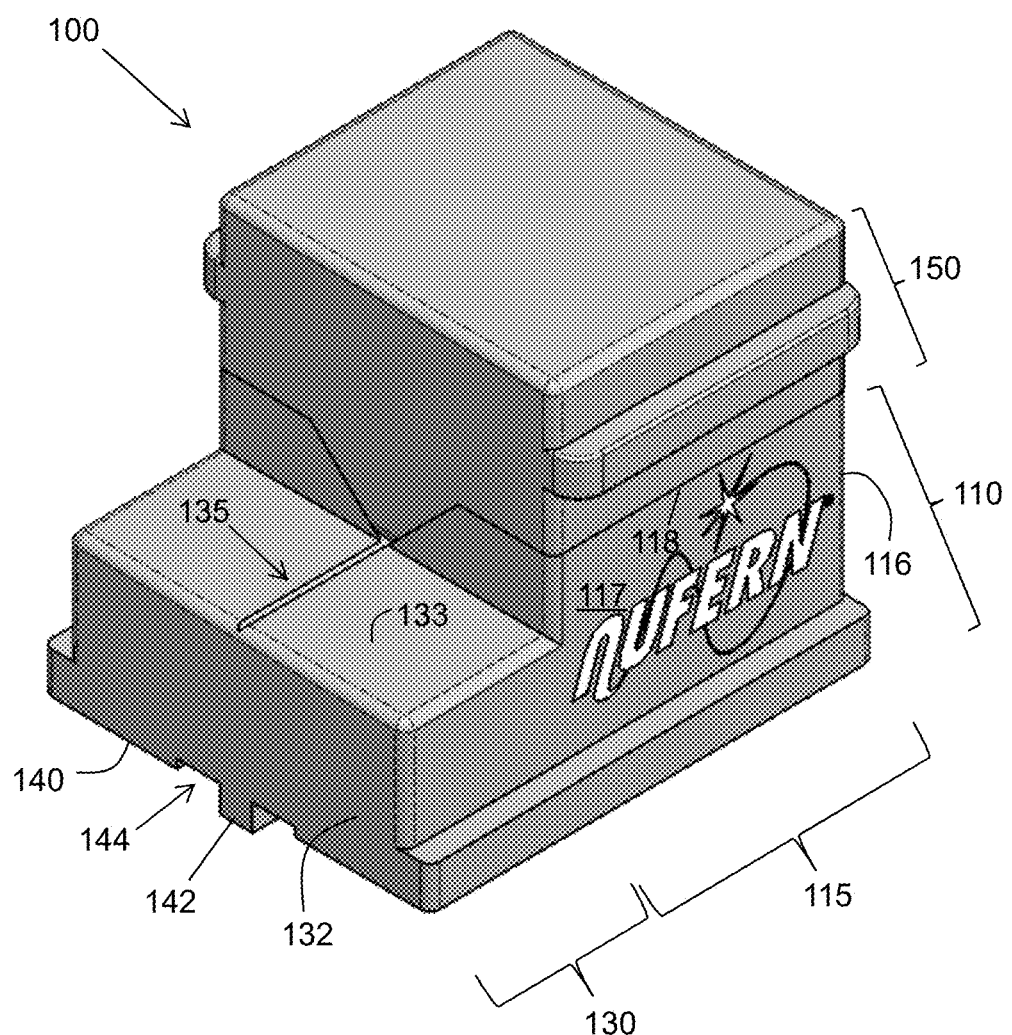
FIG. 1 is a rear perspective view of a mount according to one embodiment of the invention.

One embodiment of the invention is a mount for use with an optical fiber. The mount includes a lower block having a first portion. The first portion of the lower block has a front surface, a rear region and a top surface, the top surface of the first portion having an upward-facing channel formed therein extending from the front surface to the rear region, the channel forming a groove at its bottom. The mount further includes an upper block disposed over the first portion of the lower block. The upper block has a downward-facing ridge that closely fits within the upward-facing channel formed in the top surface of the first portion of the lower block, the downward-facing ridge including one or more holding surfaces disposed adjacent the groove and extending along the downward-facing ridge. The upper block is held against the first portion of the lower block, such that the downward-facing ridge of the upper block is held in the upward-facing channel of the lower block, and such that the one or more holding surfaces are positioned to hold the optical fiber in the groove at the bottom of the channel of the first portion of the lower block.

In certain embodiments, the lower block further includes a second portion disposed behind the first portion. The second portion of the lower block has a rear surface opposing the front surface of the first portion and a top surface, the top surface of the second portion having formed therein a groove extending from the first portion to the rear surface of the second portion, the groove of the second portion being linearly aligned with the groove at the bottom of the channel of the first portion. Of course, in other embodiments, no second portion is provided.

One embodiment of an optical fiber mount according to the invention is shown in various views in FIGS. 1-5. Mount 100 includes a lower block 110, which has a first portion 115 and a second portion 130 disposed behind the first portion. The first portion 115 has a front surface 116, a rear region 117 and a top surface 118. The top surface 118 of the first portion has an upward-facing channel 120 formed therein, extending from the front surface 116 of the first portion to the rear region 117 of the first portion. The channel 120 forms a groove 121 at its bottom.

In the embodiment of FIGS. 1-5, the lower block 110 further includes a second portion 130 disposed behind the first portion, such that rear region 117 of the first portion of the lower block is disposed adjacent the second portion 130 of the lower block. The second portion 130 includes a rear surface 132 opposing the front surface 116 of the first portion 115, and a top surface 133. The top surface 133 has a groove 135 formed therein. The groove 135 extends from the first portion 115 of the lower block to the rear surface of the second portion, and is linearly aligned with the groove 121 at the bottom of the channel of the first portion.

In the embodiment of FIGS. 1-5, the mount 100 further includes an upper block 150 disposed over the first portion 115 of the lower block 110. The upper block 150 includes a downward-facing ridge 142 that closely fits within the upward-facing channel 120 formed in the top surface 118 of the first portion of the lower block. In this embodiment, the downward-facing ridge 142 includes a holding surface 143 extending along the downward-facing ridge and disposed adjacent the groove 121 at the bottom of the channel of the first portion of the lower block.

Figure 4:
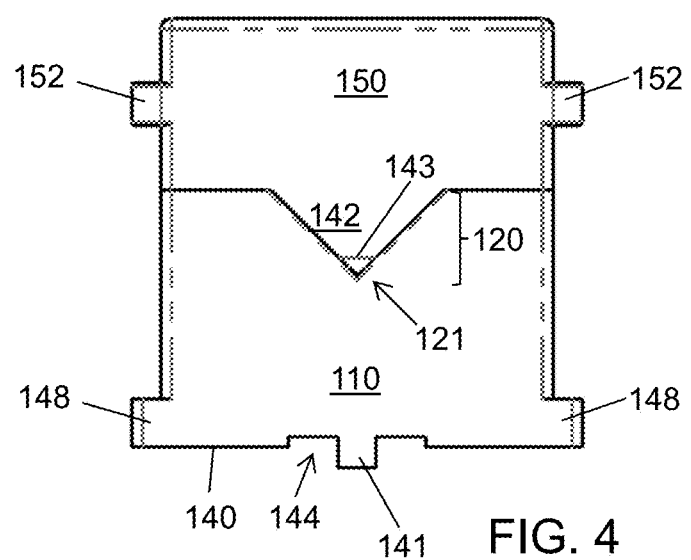
FIG. 4 is a front view of the mount of FIG. 1.
Figure 5:
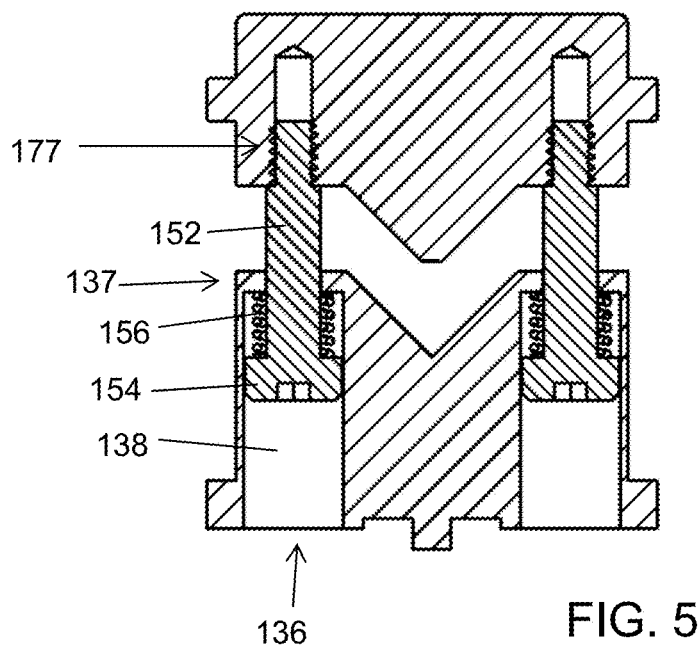
FIG. 5 is a cross-sectional view of the mount of FIG. 1.
Figure 6:
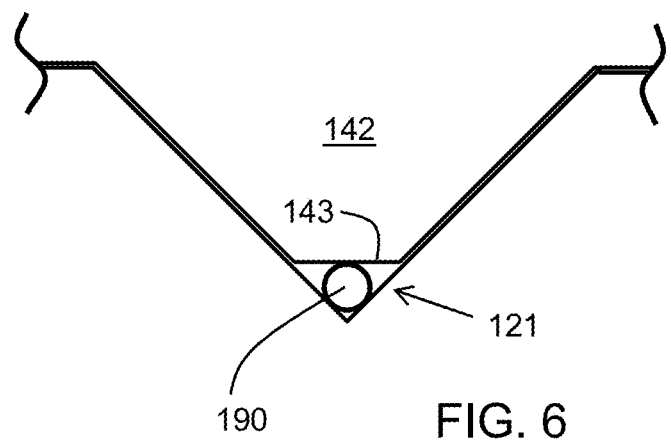
FIG. 6 is a partial schematic cross-sectional view of the mount of FIGS. 1-5, holding an optical fiber.

Notably, the upper block is held against the lower block, such that the downward-facing ridge 142 of the upper block is held in the upward-facing channel 120 of the lower block, and such that the holding surface 143 of the downward-facing ridge is positioned to hold an optical fiber in the groove 121 at the bottom of the channel of the first portion of the lower block. In the embodiment of FIGS. 1-5 (most clearly seen in FIG. 4), the holding surface 143 and the groove 121 are positioned to hold an optical fiber. FIG. 6 is a partial cross-sectional schematic view of the mount of FIGS. 1-5, with an optical fiber 190 held therein. Because the upper block is held against the first portion of the lower block, the holding surface 143 of the downward-facing ridge 142 of the upper block holds the optical fiber 190 in the groove 121 of the lower block.

Figure 2:
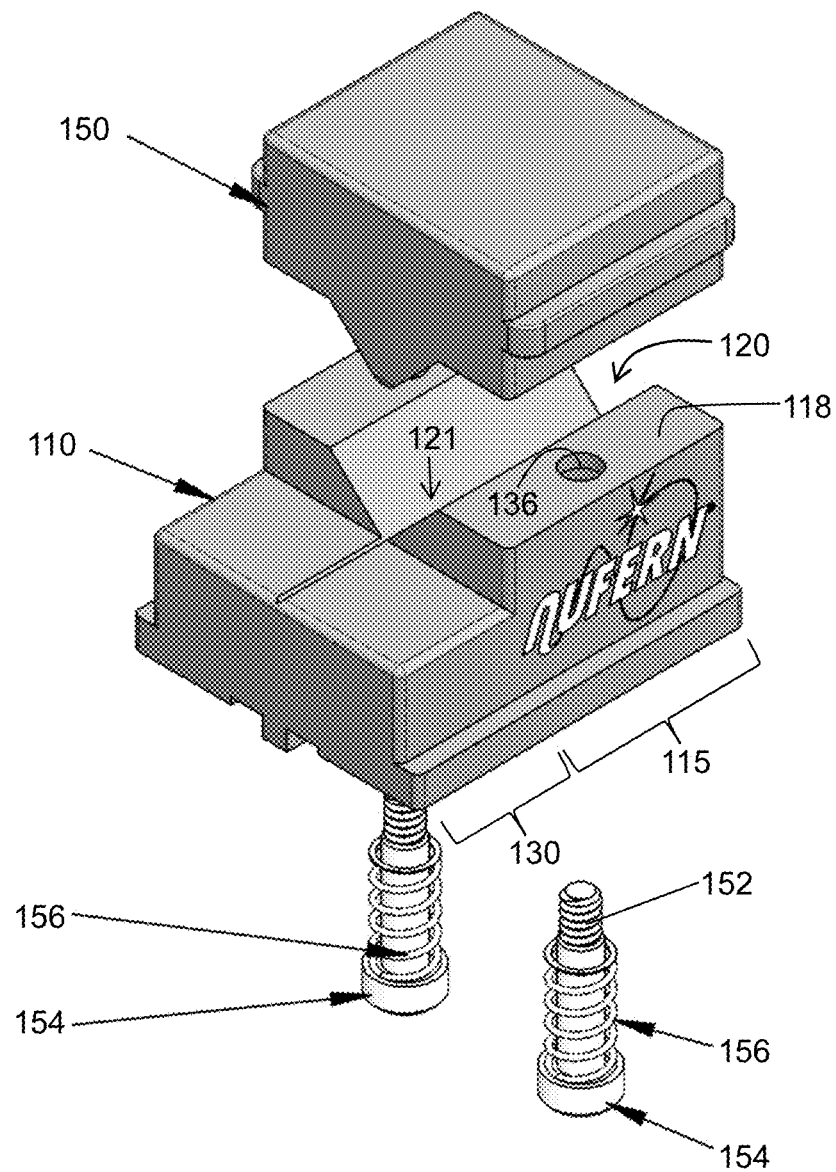
FIG. 2 is a rear perspective exploded view of the mount of FIG. 1.
Figure 3:
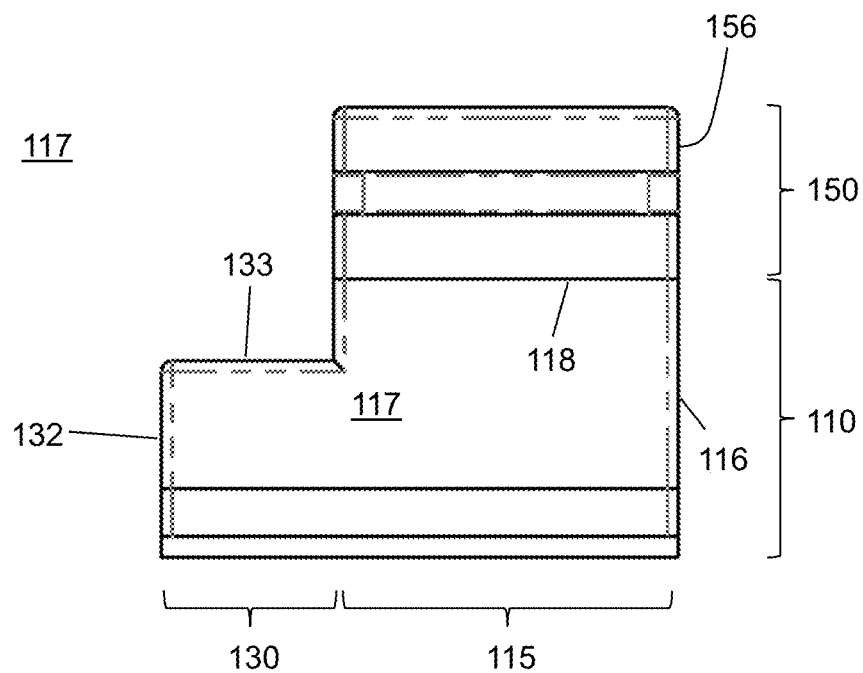
FIG. 3 is a side view of the mount of FIG. 1.

In certain embodiments, the upper block has a front surface that is substantially coplanar with the front surface of the first portion of the lower block. For example, in the embodiment of FIGS. 1-5, and as shown in FIG. 3, the upper block 150 has a front surface 156 that is coplanar with the front surface 116 of the first portion of the lower block. In certain embodiments, and as in the embodiment of FIGS. 1-5, the downward-facing ridge extends to the front surface of the upper block. In certain embodiments, and as in the embodiment of FIGS. 1-5, the one or more holding surfaces of the downward-facing ridge extend to the front surface of the upper block.

The upward-facing channel of the lower block and the downward-facing channel of the first portion of the upper block can be formed in a variety of shapes. For example, as in the embodiment of FIGS. 1-5, the upward-facing channel formed in the top surface of the first portion of the lower block is v-shaped. The v-shape can have an angle (i.e., of the sides of the v-shape to the vertical) in the range of about 25 degrees to about 65 degrees, e.g., about 35 degrees to about 55 degrees. For example, as in the embodiment of FIGS. 1-5, the v-shape can have an angle of about 45 degrees.

In certain embodiments, when the upward-facing channel formed in the top surface of the first portion of the lower block is v-shaped, the groove of the first portion is formed from the apex of the v-shaped channel. For example, in the embodiment of FIGS. 1-5, the groove 121 is formed from the apex of the v-shaped channel.

When the upward-facing channel of the first portion of the lower block has a v-shape, the downward-facing ridge of the upper block can also have a v-shape, configured to fit closely with the upward-facing channel of the first portion (i.e., with the same angle as v-shape of the upward-facing channel).

Of course, in other embodiments, the upward-facing channel of the first region of the lower block and the downward-facing channel of the upper block can be formed differently as described with respect to FIGS. 1-5. For example, in certain embodiments, the upward-facing channel of the first portion of the lower block is v-shaped, but the groove is not formed as the apex of the v-shape of the upward-facing channel. For example, as shown in the partial schematic cross-sectional view of FIG. 7, the groove can be v-shaped, but formed with a different angle than the v-shape. In other embodiments, the groove can have a different shape (e.g., rectangular).

In other embodiments, the upward-facing channel is not v-shaped, but rather has some different shape. For example, in the embodiment shown in the partial schematic cross-sectional view of FIG. 8, the upward-facing channel of the first portion of the lower block has a rectangular cross-section. In this embodiment, the groove also has a rectangular cross section; however, the person of ordinary skill in the art will appreciate that the shape of the groove can be selected independently from the shape of the upward-facing channel.

In certain embodiments, the downward-facing ridge of the upper block substantially fills the cross-sectional area of the upward-facing channel of the lower block (i.e., except for the region in which an optical fiber is to be held). For example, in the embodiment of FIGS. 1-5, the v-shape of the downward-facing ridge substantially fills the cross-sectional area of the v-shaped upward-facing channel of the lower block (i.e., except for the region in which an optical fiber is to be held). In other embodiments, the downward-facing ridge only partially fills the cross-sectional area of the upward-facing channel. For example, in the embodiment shown in the partial schematic cross-sectional view of FIG. 9, the downward-facing ridge of the upper block only partially fills the cross-sectional area of the upward-facing channel of the lower block. Notably, the downward-facing ridge does fit closely within the upward-facing channel in the region immediately upward from the region in which an optical fiber is to be held.

As noted above, the groove at the bottom of the upward-facing channel of the lower block can be formed with a variety of geometries. For example, the groove can be formed with a v-shape or a rectangular shape as described with respect to FIGS. 1-9. In other embodiments, the groove has a different shape. The person of ordinary skill in the art will select a groove shape that cooperates with the one or more holding surfaces of the downward-facing ridge of the upper block to hold a desired optical fiber.

Figure 7:
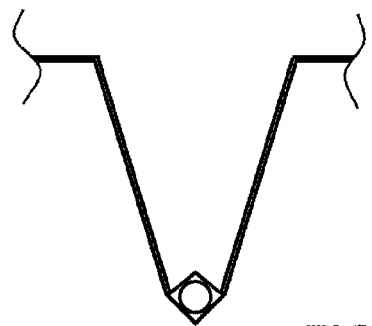
FIG. 7 is a partial schematic cross-sectional view of a mount according to another embodiment of the invention.
Figure 8:
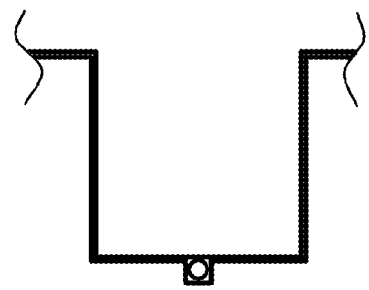
FIG. 8 is a partial schematic cross-sectional view of a mount according to another embodiment of the invention.
Figure 9:
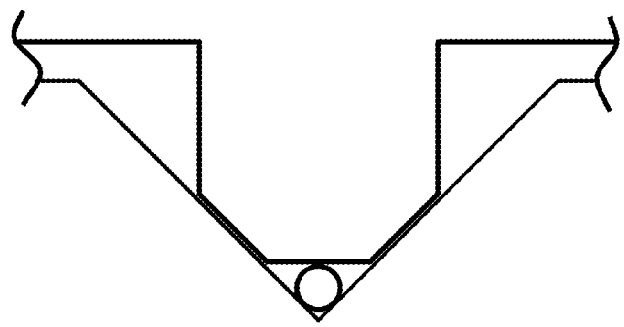
FIG. 9 is a partial schematic cross-sectional view of a mount according to another embodiment of the invention.

Similarly, the one or more holding surfaces of the downward-facing ridge of the upper block can be formed with a variety of geometries. For example, as shown in FIGS. 6 and 9, the holding surface can be a flat substantially horizontal surface formed at the bottom of a triangular portion of the downward-facing ridge. In other embodiments, as shown in FIG. 7, two (or more) holding surfaces are provided on the downward-facing ridge of the upper block, to form a downward-facing groove thereon. In other embodiments, as shown in FIG. 8, the holding surface is a downward-facing surface of the overall shape of the downward-facing ridge. The person of ordinary skill in the art will select an arrangement of one or more holding surfaces that cooperates with the groove of the upward-facing channel of the lower block to hold a desired optical fiber.

As noted above, and as shown in FIGS. 1-9, the upper block is held against the first portion of the lower block, such that the one or more holding surfaces of the downward-facing ridge of the upper block hold the optical fiber in the groove of the lower block. In certain embodiments, the upper block is resiliently held against the first portion of the lower block, such that the upper block can be lifted away from the lower block, but will spring back to be held against the first portion of the lower block. For example, the upper block can be resiliently held against the top surface of the first portion of the lower block by one or more springs. One such embodiment is shown in the views of FIGS. 2 and 5. In this embodiment, the upper block includes one or more (here, two) downward-facing threaded holes 177; and the first portion of the lower block has one or more (here two) bolt holes 136 formed therein, aligned with the downward-facing threaded holes in the upper block. Bolts 152, which include bolt heads 154 are disposed through the bolt holes 136 of the first portion of the lower block and screwed into the threaded holes 177 of the upper block. A spring 156 is disposed about each bolt 152 in the bolt holes 136. The diameter of the spring is larger than the shaft of the bolt, but smaller than the bolt head, such that the spring is constrained to surround the bolt shaft. Each bolt hole 136 has a wide portion 137, in which the bolt head can fit, and a feature 138 extending into the wide portion that blocks the bolt head and the spring from further movement toward the upper block. Accordingly, when the upper block is lifted away from the first portion of the lower block as shown in FIG. 5, each spring is compressed by its corresponding bolt head against the feature. Even when the upper block is disposed against the first portion of the lower block, each spring can be in compression, such that the upper block is held with some force against the first portion of the lower block. The person of ordinary skill in the art will select spring sizes and materials and the configuration of the bolts and bolt holes to provide the desired spring forces. Of course, the person of ordinary skill in the art will appreciate that the mounts can be otherwise configured such that the upper block is resiliently held against the first portion of the lower block.

Figure 10:
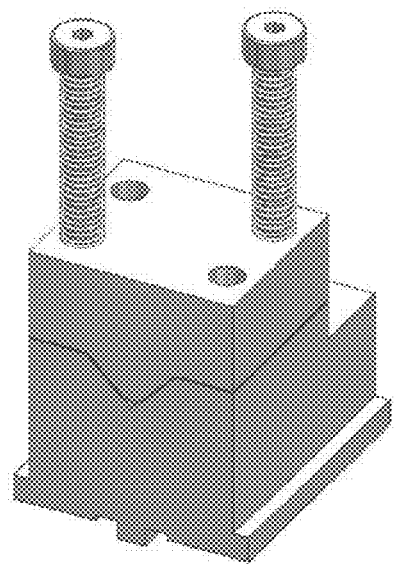
FIG. 10 is a front perspective view of a mount according to another embodiment of the invention.

In other embodiments, the upper block is held against the first portion of the lower block in some other fashion. For example, the upper block can be held against the lower block by one or more bolts. An example of such an embodiment is shown in front perspective view in FIG. 10. In this embodiment, bolts feed through the upper block and screw into threaded holes in the first portion of the lower block. Of course, the person of ordinary skill in the art will appreciate that the mounts can be otherwise configured such that the upper block is held against the first portion of the lower block. The embodiment of FIG. 10 can also be fitted with spring-loaded bolts as described above with respect to FIGS. 1-9, such that the bolts heads can be accessed from the top surface of the upper block.

As the person of ordinary skill in the art will appreciate, the optical fiber mounts described herein can be configured to hold a variety of types of optical fibers. For example, in one embodiment, the optical fiber mount is configured to hold an optical fiber (i.e., between the groove in the channel formed in the first portion of the lower block and the one or more holding surfaces of the downward-facing ridge of the upper block) that does not include a polymeric coating. For example, such an optical fiber can have a diameter in the range of about 80 µm to about 200 µm (e.g., about 125 µm). In other embodiments, the optical fiber mount is configured to hold an optical fiber (i.e., between the groove in the channel formed in the first portion of the lower block and the one or more holding surfaces of the downward-facing ridge of the upper block) that does include one or more polymeric coatings. For example, such an optical fiber can have a diameter in the range of about 200 µm to about 500 µm (e.g., in the range of about 225 µm to about 275 µm, or about 250 µm).

Figure 11:
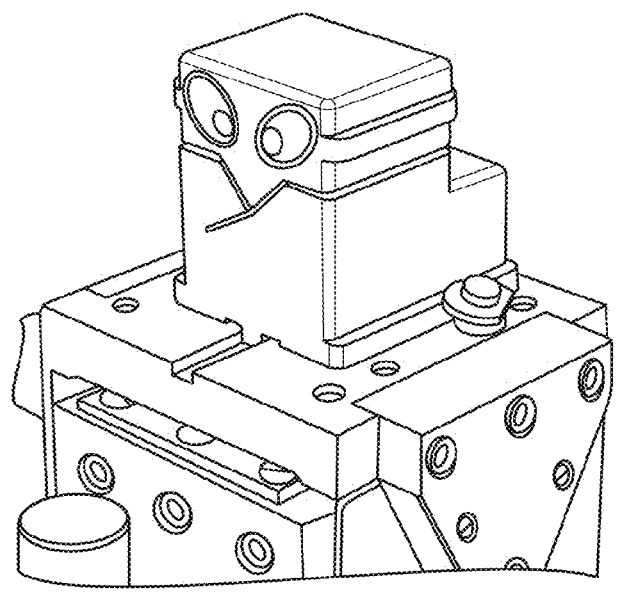
FIG. 11 is a front perspective view of a mount holding an optical fiber according to another embodiment of the invention.

In many circumstances, it will be desirable to fix an optical fiber mount as described herein to a surface, such as an optical bench or a surface of a translation stage. In certain embodiments, the lower block has a bottom surface, and a rail extending from the bottom surface. In certain embodiments, the rail can be formed parallel to the groove in the channel of the lower block. Moreover, in certain embodiments, the rail can be flanked by one or two channels formed in the bottom surface of the lower block. For example, as shown in FIGS. 1-5, the lower block 110 has a bottom surface 140, with a rail 141 extending therefrom, parallel to the groove 135. The rail 141 is flanked by channels 144 formed in the bottom surface 140. The rail can mate, for example, with a corresponding channel in a surface to which the mount is to be fixed, e.g., an optical table or a translation stage. An example is shown in FIG. 11, in which the rail extending from the bottom surface of the lower block fits in a channel on a translation stage.

In certain embodiments, the lower block of the mount includes one or more flanges extending therefrom. For example, in the embodiment of FIGS. 1-5, flanges 148 extend laterally from the lower block 110. The flanges can be formed, as shown in FIG. 4, so that they have a common bottom surface with the bottom surface of the lower block. Such flanges can, for example, be used with standard optomechanical hardware to fix the mount to a surface such as an optical bench or a translation stage. An example is shown in FIG. 11, in which the mount is held to the translation stage by conventional hardware.

As the person of ordinary skill in the art will appreciate, structures conventional in the art can additionally or alternatively be used to fix an optical fiber mount as described herein to a surface.

In certain embodiments, the upper block has one or more flanges extending laterally therefrom. For example, in the embodiment shown in FIGS. 1-5, the upper block 150 has two flanges 152 extending vertically therefrom. The flanges can, for example, provide an area for a user to grip the upper block in order to pull it away from the lower block.

Each of the optical fiber mounts of FIGS. 1-11 is configured to hold a single optical fiber. However, the person of ordinary skill in the art will appreciate that the optical fiber mounts described herein can be configured to hold a plurality of optical fibers. For example, in certain embodiments, the upward-facing channel of the first portion of the lower block has a plurality of grooves formed therein (and, if present, the second portion of the lower block has a plurality of grooves formed therein, registered to the plurality of grooves in the first portion as described above); and the downward-facing ridge of the upper block has formed thereon one or more holding surfaces configured such that the one or more holding surfaces are positioned to hold an optical fiber in each of the grooves at the bottom of the channel of the first portion of the lower block. In other embodiments, the first portion of the lower block has a plurality of channels formed therein, each of which has a groove formed therein, as described above with respect to the single-fiber embodiments. If present, the second portion of the lower block has a plurality of grooves formed therein, registered to the plurality of grooves in the first portion as described above. The upper block includes a plurality of downward-facing ridges, each registered to one of the channels, and each having formed thereon one or more holding surfaces configured such that the one or more holding surfaces are positioned to hold an optical fiber in the groove at the bottom of its corresponding channel.

As the person of ordinary skill will appreciate, the optical fiber mounts described herein can be formed from a variety of materials. For example, the optical fiber mounts can be made from a metal, such as aluminum. In other embodiments, the optical fiber mount is made from steel.

The optical fiber mounts described herein can be made in a variety of sizes. For example, in certain embodiments, an optical fiber mount (i.e., when the upper block is held against the first portion of the lower block) has a vertical dimension in the range of about 0.5" to about 4"; a lateral dimension (i.e., in a direction orthogonal to the groove in which an optical fiber is held) in the range of about 0.5" to about 4"; and a depth (i.e., in a direction substantially parallel to the groove in which an optical fiber is held) in the range of about 0.5" to about 4". In certain embodiments, when the second portion of the lower block is present, it has a depth (i.e., in a direction substantially parallel to the groove in which an optical fiber is held) in the range of about 0.2" to about 3". For example, the optical fiber mount of FIGS. 1-5 has a height of about 1.25"; a lateral dimension of about 1.3"; and a depth of about 1.5", with the second portion of the lower block having a depth of about 0.5". In another example of an optical fiber mount, the lower block is about 0.21" taller, such that the overall mount has a height of about 1.25"; a lateral dimension of about 1.46"; and a depth of about 1.5", with the second portion of the lower block having a depth of about 0.5". The person of ordinary skill in the art will select particular sizes of the various elements to be suitable for use with different optomechanical mounts and systems.

One embodiment of the invention relates to an optical fiber mount as described herein without an optical fiber disposed therein. Another embodiment of the invention relates to an optical fiber mount as described herein, with the optical fiber held in the groove at the bottom of the upward-facing channel of the first portion of the lower block by the one or more holding surfaces of the downward-facing ridge of the upper block. In embodiments configured to hold multiple optical fibers, multiple optical fibers can be held in the mount, one held in each groove at the bottom of an upward-facing channel of the first portion of the lower block by one or more of the holding surfaces of a downward-facing ridge of the upper block. The optical fiber can have an end positioned, for example, within 1" of the front face of the lower block.

Advantageously, the optical fiber mounts described herein can be used with optical fibers configured to handle relatively high optical powers. For example, in certain embodiments of the optical fiber mounts described herein, the optical fiber is configured to transmit at least about 1 W, at least about 5 W, or even at least about 10 W of optical power. For example, the optical fiber can be operatively coupled to an optical source that outputs at least about 1 W, at least about 5 W, or even at least about 10 W of optical power, or transmits at least about 1 W, at least about 5 W, or even at least about 10 W of optical power. For example, the optical fiber can transmit at least about 100 W of optical power, or even at least 1 kW of optical power, or can be operatively coupled to an optical source that outputs at least about 100 W, or even at least about 1 kW of optical power. In certain embodiments, the optical fiber is an amplifying optical fiber. For example, the optical fiber can be doped with one or more rare earth metals (e.g., Er, Tm, Nd, Ho, Yb, Pr). In certain embodiments, the optical fiber is an amplifying optical fiber operatively coupled to a source of pump radiation suitable to pump the amplifying optical fiber.

Figure 12:
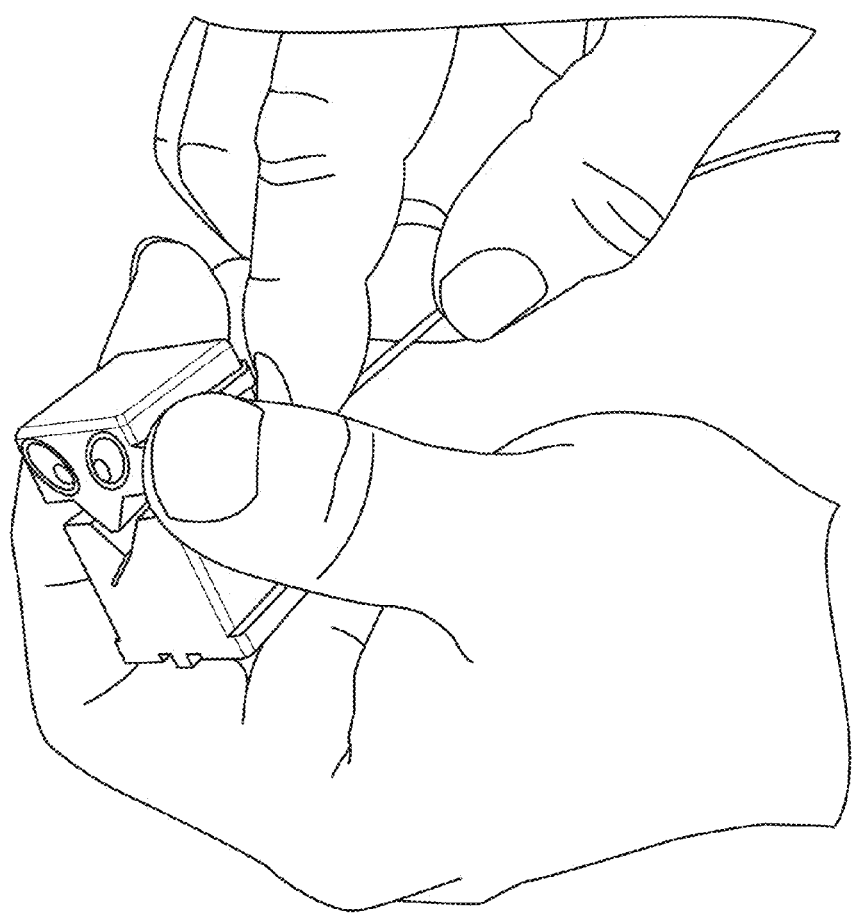
FIG. 12 is a photograph of an optical fiber being inserted into an optical fiber mount as described herein.

Various embodiments of the mounts described herein are especially advantaged with respect to use with optical fiber systems (especially high power optical fiber systems) in a variety of ways. For example, the use of a groove and a holding surface extending along the groove to hold an optical fiber provides a very long surface of continuous contact with the optical fiber. Thus, any scattered or reflected light can be absorbed over this long distance, reducing damage to the optical fiber (especially to any polymeric coatings formed thereon). The large thermal mass and area for radiation can absorb and dissipate energy without causing localized heating and therefore damage to the fiber. This can be especially helpful when the optical fiber is an amplifying optical fiber. Amplifying optical fibers can heat up when pumped; the devices and methods described herein can help to dissipate the heat generated during amplification. Moreover, the relatively large forward faces of the upper block and the lower block can shield the bulk of the optical fiber from back-reflected light from instruments and optics disposed in front of the mount. In embodiments including a second portion of the lower block as described herein, the second portion of the lower block can provide a convenient surface for a user to position and hold an optical fiber while closing the upper block onto the first portion of the lower block, for example, as shown in FIG. 12.

Another aspect of the invention is a method for mounting an optical fiber in a mount as described herein. The method includes disposing the optical fiber in the groove of the lower block, then positioning the upper block against the lower block such that the one or more holding surfaces are configured to hold the optical fiber in the groove at the bottom of the channel of the first portion of the of the lower block. The method can also include, before disposing the optical fiber in the groove, moving the upper block away from the lower block.

For example, in using the mount described above with respect to FIGS. 1-9, the upper block can be moved away from the lower block by lifting the upper block away from the lower block against the force of the springs. The fiber can be inserted into the groove, then the upper block can be lowered into place, allowing the springs to resiliently hold the upper block against the lower block and the holding surfaces to resiliently hold fiber in the groove.

The mount described above with respect to FIG. 10 can be used in a similar fashion. Additionally, a mount having bolts accessible from the top surface of the upper block can be used by unscrewing one (or more) of the bolts so that it can be lifted out of the lower block. With one (or more) of the bolts removed, a section of optical fiber can be inserted into the groove from a side of the mount. And if all but one of the bolts are unscrewed, the upper block can be rotated away from the lower block, such that an optical fiber can be inserted into the groove from the top. Thus, by removing one or more bolts, an internal section (e.g., greater than 1 m or even greater than 10 m from the closest end) of an optical fiber can conveniently be held in the mount.

It is understood that the use of the term "a", "an" or "one" herein, including in the appended claims, is open-ended and means "at least one" or "one or more", unless expressly defined otherwise. The occasional use of the terms herein "at least one" or "one or more" to improve clarity and to remind of the open nature of "one" or similar terms shall not be taken to imply that the use of the terms "a", "an" or "one" alone in other instances herein is closed and hence limited to the singular. Similarly, the use of "a part of", "at least a part of" or similar phrases (e.g., "at least a portion of") shall not be taken to mean that the absence of such a phrase elsewhere is somehow limiting.

Subsequent reference to the phrase "at least one", such as in the phrase "said at least one", to specify, for example, an attribute of the limitation to which "at least one" initially referred is not to be interpreted as requiring that the specification must apply to each and every instance of the limitation, should more than one be under consideration in determining whether the claim reads on an article, composition, machine or process, unless it is specifically recited in the claim that the further specification so applies.

The use of "or", as in "A or B", shall not be read as an "exclusive or" logic relationship that excludes from its purview the combination of A and B. Rather, "or" is intended to be open, and include all permutations, including, for example A without B; B without A; and A and B together, and as any other open recitation, does not exclude other features in addition to A and B.

Any of the features described above in conjunction with any one aspect described above can be combined with a practice of the invention according to any other of the aspects described above, as is evident to one of ordinary skill who studies the disclosure herein.

Those of ordinary skill in the art will recognize or be able to ascertain, using no more than routine experimentation, many equivalents to the specific embodiments of the invention described herein. It is therefore to be understood that the foregoing embodiments are presented by way of example only and that within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not expressly taught as mutually inconsistent, is included within the scope of the present invention.

What is claimed is:

1. A mount for use with an optical fiber, the mount having a front surface, the mount comprising
   a lower block comprising
      a first portion, the first portion having a front surface forming the front surface of the mount, a rear region and a top surface, the top surface of the first portion having an upward-facing channel formed therein extending from the front surface to the rear region, the channel forming a groove at its bottom and
      a second portion disposed behind and against the first portion, the second portion having a rear surface opposing the front surface of the first portion and a top surface, the top surface of the first portion having formed therein a groove that extends continuously from the groove of the channel of the first portion of the lower block to the rear surface of the second portion; and
   an upper block having a front surface and a rear surface, the front surface of the upper block being substantially coplanar with the front surface of the first portion of the lower block the upper block being disposed over the first portion of the lower block but not over the second portion of the lower block, the upper block having a downward-facing ridge that extends continuously from the front surface of the upper block to the rear surface of the upper block and closely fits within the upward-facing channel formed in the top surface of the first portion of the lower block, the downward-facing ridge including one or more holding surfaces disposed adjacent the groove and extending continuously along the downward-facing ridge,
   the upper block being held against the first portion of the lower block, such that the one or more holding surfaces are configured to hold the optical fiber in the groove at the bottom of the channel of the first portion of the lower block.

2. The mount according to claim 1, wherein the upward-facing channel formed in the top surface of the first portion of the lower block is v-shaped.

3. The mount according to claim 2, wherein the groove of the first portion is formed from the apex of the v-shaped channel.

4. The mount according to claim 2, wherein the downward-facing ridge is v-shaped, and wherein the one or more holding surfaces comprise a horizontal surface formed at the apex of the v-shaped ridge.

5. The mount according to claim 1, wherein the downward-facing ridge of the upper block substantially fills the cross-sectional area of the upward-facing channel of the lower block.

6. The mount according to claim 1, wherein the upper block is resiliently held against the top surface of the first portion of the lower block by one or more springs.

7. The mount according to claim 1, wherein the upper block is held against the top surface of the first portion of the lower block by one or more bolts.

8. The mount according to claim 1, wherein the optical fiber mount is configured to hold an optical fiber that does not include a polymer coating, the optical fiber having a diameter in the range of about 80 μm to about 200 μm.

9. The mount according to claim 1, wherein the optical fiber mount is configured to hold an optical fiber that includes one or more polymer coatings, the optical fiber having a diameter in the range of about 200 μm to about 500 μm.

10. The mount according to claim 1, wherein the lower block has one or more flanges extending therefrom.

11. The mount according to claim 1, having the optical fiber held in the groove at the bottom of the upward-facing channel of the first portion of the lower block by the one or more holding surfaces of the downward-facing ridge of the upper block.

12. The mount according to claim 11, wherein the optical fiber is configured to transmit at least about 1 W of optical power.

13. The mount according to claim 1, wherein the optical fiber is an amplifying optical fiber.

14. The mount according to claim 13, wherein the optical fiber is configured to transmit at least about 100 W of optical power.

15. The mount according to claim 1, wherein, when the upper block is held against the first portion of the lower block, the mount has a vertical dimension in the range of 0.5" to 4"; a lateral dimension in a direction orthogonal to the groove in which an optical fiber is held in the range of 0.5" to 4"; and a depth in a direction substantially parallel to the groove in which an optical fiber is held in the range of 0.5" to 4".

16. The mount according to claim 1, wherein the groove of the second portion of the lower block is formed in a substantially flat upper surface of the lower block, which upper surface does not include a channel.

17. A method for mounting an optical fiber in a mount according to claim 1, the method comprising disposing the optical fiber in the groove of the lower block, then, while holding the optical fiber against the groove of the lower block in the second portion thereof, positioning the upper block against the lower block such that the one or more holding surfaces hold the optical fiber in the groove at the bottom of the channel of the first portion of the of the lower block.

18. The method according to claim 17, further comprising, before disposing the optical fiber in the groove, moving the upper block away from the lower block.

19. The method according to claim 18, wherein moving the upper block away from the lower block comprises lifting the upper block away from the lower block.

20. The method according to claim 18, wherein moving the upper block away from the lower block comprises removing one or more bolts joining the upper block to the lower block.

* * * * *